(No Model.)

L. T. FOSS.
ARTIFICIAL TOOTH.

No. 275,625. Patented Apr. 10, 1883.

Witnesses.
John F. C. Prendirt
Fred A. Powell.

Inventor.
Lewis T. Foss.
by Crosby & Gregory
Atty's.

UNITED STATES PATENT OFFICE.

LEWIS T. FOSS, OF BOSTON, MASSACHUSETTS.

ARTIFICIAL TOOTH.

SPECIFICATION forming part of Letters Patent No. 275,625, dated April 10, 1883.

Application filed November 9, 1882. (No model.)

*To all whom it may concern:*

Be it known that I, LEWIS T. FOSS, of Boston, county of Suffolk, State of Massachusetts, have invented an Improvement in Methods of Forming Artificial Teeth, of which the following description, in connection with the accompanying drawings, is a specification, like letters on the drawings representing like parts.

In the manufacture of artificial teeth having metal back plates upon which are soldered the metal pivots for the roots it has been customary to attach the metal back plates by solder to four metal pins previously inserted in the teeth; but teeth made in this way are objectionable, for in use and when subjected to strain the teeth are liable to be broken off where the pins enter them, and their use is also objectionable to the dentist, for when the back plate is being soldered to the said pins the tooth is liable to be broken where the pins enter the latter. Experiments to produce a strong tooth at the least cost, and also to produce a tooth which could be most conveniently used by a dentist, have developed the fact that the strength and durability of the tooth may be greatly enhanced by incorporating the back plate with the plastic material to form the tooth by molding the two together, and then baking the plastic material, which is thus caused to adhere closely to the back plate, or to a projection or pins or lugs thereof; but even this construction does not give all the needed stability, and I have found that providing the plate with a longitudinal projection or rib which is baked in the tooth overcomes all the difficulties I have experienced; and my invention therefore consists in providing the metal back plate to be baked in the tooth with a longitudinal projection or rib, which may or may not be, but preferably is, supplemented by pins or prongs, as hereinafter set forth and claimed.

Figure 1:
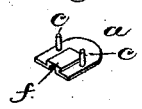
Figure 3:
Figure 2:
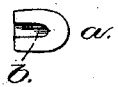
Figure 4:
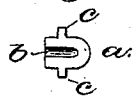
Figure 5:
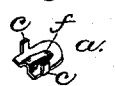

Figure 1 is a rear side view of a metal back plate suitably shaped to have a tooth attached to it in accordance with my invention; Fig. 2, a front view of the said back plate; Fig. 3, a completed tooth baked upon the back plate; and Figs. 4 and 5 represent two views of a modified construction of back plate, to be referred to.

In the manufacture of a tooth in accordance with my invention I form the back plate, $a$, from sheet metal, and preferably by means of a punch and a suitable die give to the said plate its proper shape or outline, depressing or corrugating the center of the plate to form at its inner side a groove or space, $b$, to receive the usual metal pivot, (not shown,) but which soldered to the back plate will be extended into the usual root. The metal displaced or thrown backward in the formation of the groove $b$ in the plate $a$ produces a longitudinal projection, $f$, at the rear side of the back plate, which projection enters the material of the tooth, and affords a most excellent means to hold the tooth upon the back plate, and prevent the tooth from tipping thereon. The projection, as herein shown, is made dovetail shape in cross-section, thus affording holding corners, back of which the plastic material of the tooth, when being molded into shape, passes; but instead of the shape shown I desire it to be understood that the said projection might be of other angular or irregular shape in cross-section, and yet be within the scope of my invention. The back plate, $a$, is also shown as provided with two pins or prongs, $c\ c$, which also enter the tooth-forming material in its plastic or unbaked condition. The tooth-forming material molded about, and so as to have either the projection or the pins or prongs embedded in it and then baked, will be held securely and immovably upon the back plate.

If desired, the back plate may be roughened or indented at its rear side to increase the adhesion to it of the tooth-forming material.

The back plate, $a$, made or shaped as described, having been placed in a recess of an ordinary tooth-shaped mold, with that side of the plate uppermost which is provided with the projection or pins or prongs to enter the material, the tooth-forming material will be packed into the said mold upon the said back plate, and its projections or pins or prongs (whichever may be used,) and the tooth $d$ having been shaped or formed in the mold and directly upon the said back plate, the molded tooth and back plate will be withdrawn from the mold and placed in a furnace, where it will be baked as usual until it assumes the proper degree of hardness. During this baking of the tooth the plastic material which was applied to the back plate is made to adhere intimately, closely, and firmly to the projection *f* of the back plate, or to the pins or prongs, or to both or either, according as they may be used, thus enabling the tooth to withstand much greater strain than heretofore without breaking.

In Fig. 4 the prongs *c* of the metal back plate are formed as parts of the blank as it is cut from sheet metal, and the said prongs are subsequently bent at right angles to the main part of the back plate, (see Fig. 5,) the pins or prongs being equivalents. When the pins or prongs are used the projection *f* may be as in Fig. 5. The prongs *c* may be struck from any part of the back plate.

I claim—

1. The back plate, *a*, provided with the longitudinal projection or rib *f*, combined with a tooth baked thereon, substantially as described.

2. The back plate, *a*, provided with the angular rib *f*, combined with the tooth *d*, baked thereon, substantially as shown and described.

3. The back plate, *a*, provided with the groove *b*, projection or rib *f*, and pins or prongs *c c*, combined with the tooth *d*, baked thereon and thereby secured thereto, substantially as shown and described.

In testimony whereof I have signed my name to this specification in the presence of two subscribing witnesses.

LEWIS T. FOSS.

Witnesses:
G. W. GREGORY,
B. J. NOYES.